Sept. 4, 1956 M. L. KUDER 2,761,968
ELECTRONIC ANALOGUE-TO-DIGITAL CONVERTERS
Filed Jan. 9, 1953 2 Sheets-Sheet 1

INVENTOR
*Milton L. Kuder*

BY *Howard L. Rose*

AGENT

Sept. 4, 1956  M. L. KUDER  2,761,968
ELECTRONIC ANALOGUE-TO-DIGITAL CONVERTERS
Filed Jan. 9, 1953  2 Sheets-Sheet 2

INVENTOR
Milton L. Kuder
BY
Howard L. Rose
AGENT

United States Patent Office 2,761,968
Patented Sept. 4, 1956

2,761,968

ELECTRONIC ANALOGUE-TO-DIGITAL CONVERTERS

Milton L. Kuder, Washington, D. C., assignor to the United States of America as represented by the Secretary of Commerce Application January 9, 1953, Serial No. 330,599

3 Claims. (Cl. 250—27)

(Granted under Title 35, U. S. Code (1952), sec. 266)

The invention described herein may be manufactured and used by or for the Government of the United States for governmental purposes without the payment to me of any royalty thereon in accordance with the provisions of 35 U. S. C. 266.

The present invention relates to an electronic conversion system and in particular to a system which converts an analogue parameter into magnitude-related digits.

In certain applications, electronic digital indicating systems offer important advantages over more conventional "analogue" indicators—those in which a pointer moves over a continuous scale, or in which the indication otherwise varies continuously with the measured quantity. In moving-pointer meters, speed of response is usually limited by mechanical characteristics of the meter, and the accuracy to which the meter can be read—about 0.5 percent in precision analogue meters—is limited by a number of factors. Also the increasing importance of digital computers in contrast with analogue computers has clearly focused attention on the fact that indicating and recording instruments are almost exclusively of the analogue type, thereby making the indicating and computing instruments incompatible.

Another field in which digital systems have distinct advantages is the telemetering field. The usual practice is to convert the information under investigation into electrical voltage levels and then send this information to a central control point. The disadvantage in this system is that random noise may produce variations in the voltage levels transmitted, thereby producing erroneous information at the other end of the system. In order to eliminate this difficulty it is proposed that the information be transmitted in the form of voltage pulses, the number of pulses transmitted being indicative of the voltage level which represents the information desired.

The primary object of the invention is to provide an electronic instrument which accurately converts an analogue parameter into magnitude-related digits.

Another object of the invention is to provide an analogue-to-digital converter which samples the unknown parameter at least 100 times a second.

Another object of the invention is to provide an analogue-to-digital converter employing novel integrator and balance-detecting means.

Another object of the invention is to provide an integrator for producing a stair-step voltage in which each increment of voltage is maintained constant over a very wide range.

Another object of the invention is to provide a first feedback circuit in the integrator to insure that the system will follow a linear function over a wide range.

Another object of the invention is to provide a second feedback circuit in the integrator in order to correct certain effects not corrected by the first feedback circuit.

Another object of the present invention is to provide a balance detector which will determine to a high order of accuracy when the analogue voltage and the output of the integrator are equal.

Another object of the invention is to provide a balance detector which presents a very high effective input impedance to the analogue voltage source.

Another object of the invention is to provide a balance detector which draws very little current from the source of analogue voltage.

Other uses and advantages of the invention will become apparent upon reference to the specification and drawings.

Figure 1:
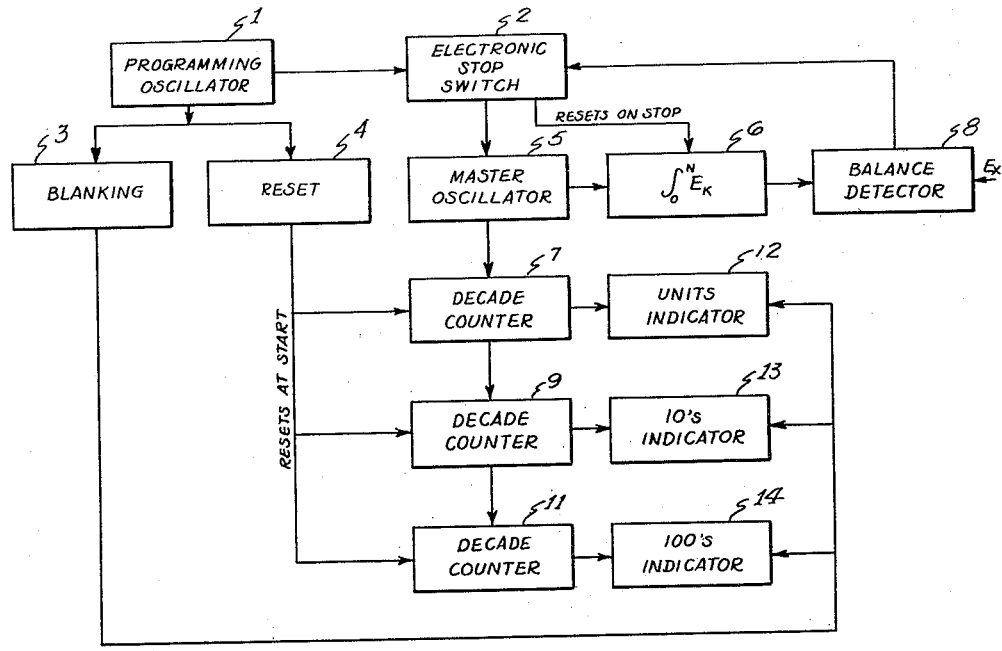
Figure 1 is a circuit diagram of an electronic metering system.

In Figure 1 there is shown a programming oscillator 1, the first output of which feeds the electronic switch 2 and the second output of which feeds the blanking generator 3 and reset generator 4. The output of the electronic switch is connected to the input of the master oscillator 5, the first output of which is connected to the integrator 6 and the second output of which is connected to the decade counter 7. The output of the integrator 6 is fed to a first input of the balance detector 8, the second input of which is connected to the analogue quantity to be measured. The output of the balance detector is connected to the second input of the electronic switch. The decade counter 7 is connected to a second decade counter 9 which is connected to a third decade counter 11. The outputs of decade counters 7, 9, and 11 are connected to the units indicator 12, tens indicator 13 and hundreds indicator 14, respectively. The output of the blanking generator 3 is connected to the indicators 12, 13, and 14, and the output of the reset generator 4 is connected to the decade counters 7, 9, and 11.

The programming oscillator 1 puts out a square wave, the positive half of which causes the blanking generator to send out a pulse to the indicators 12, 13, and 14 to prevent them from registering during a count. The same pulse causes the reset generator 4 to reset the decade counters 7, 9, and 11 to zero count. The other output of the programming oscillator 1 causes the electronic switch to turn on the master oscillator 5. Sufficient time delay must be provided so that the master oscillator is not started until the indicators have been blanked and the counters have been reset to zero. The first output of the master oscillator 5 is fed to the integrator 6, each pulse of the oscillator causing the output of the integrator to be increased by a single voltage increment of a precisely determined value. For each pulse sent by the master oscillator to the integrator 6, there is a corresponding pulse sent to the decade counter 7, which therefore counts the number of pulses sent to the integrator. When the decade counter 7 has counted to 10, it sends a pulse to the decade counter 9, which in turn sends a pulse to decade counter 11 when it has made a count of 10. Therefore the decade counter 7 is a units counter, decade counter 9 is a tens counter, and decade counter 11 is a hundreds counter. If necessary, more counters can be added to increase the count over the 999 available in the system described. Each time the decade counter 7 receives a pulse from the master oscillator, it puts out a pulse to the unit indicator, causing it to increase its count by one. The tens indicator 13 and the hundreds indicator 14 receive pulses in the same manner from the decade counters 9 and 11, respectively. Therefore when the master oscillator has been stopped in the manner to be explained later, and the indicators are unblanked, they will indicate the number of pulses put out by the master oscillator during the integrating interval.

The output of the integrator 6 is increased by a predetermined value each time the integrator receives a pulse from the master oscillator. The incremental voltage increase at the output of the integrator is controllable. The specific increment employed depends upon the range of voltages to be measured and the degree of accuracy required.

When the voltage level of the output of the integrator is equal to the voltage level of the unknown voltage $E_x$, the balance detector sends a pulse to the electronic switch, causing the switch to send a pulse to the master oscillator, preventing it from operating further. Since the decade counters have counted the number of pulses necessary to produce an integrator output which is exactly equal to the unknown voltage, and since the increase in the output of the integrator for each pulse from the master oscillator is known, it is a simple matter to convert the reading on the indicators 12, 13, and 14 to the voltage $E_x$. The frequency of the programming oscillator must be such that the master oscillator may complete its maximum number of oscillations before the programming oscillator has completed a half cycle. That is, the master oscillator must be able to complete 999 cycles, the maximum count possible with the number of decade counters shown, before the programming oscillator sends a control pulse to the blanking and reset generators. The negative output from the programming oscillator has no effect upon the electronic switch or the reset mechanism, but it causes the unblanking generator to produce an output which unblanks the indicators 12, 13, and 14 and allows them to be read or to produce a permanent record, depending upon the type of indicators used. At the beginning of the next cycle of the programming oscillator, the indicators are again blanked and the reset generator 4 sends out a pulse which resets the decade counters, which in turn reset the indicators.

The equipment may all be at one location or the decade counters and indicators may be located at some distance from the rest of the unit. In the latter case contact between the two locations may be established by wire or radio.

As previously pointed out, the integrator 6 is the element which governs the overall accuracy of the system. This unit must put out a precise increase in voltage for each pulse received from the master oscillator. In order to accomplish this result the analogue integrator operates on the basis of a constant coulomb capacitor counter. The method of counting is essentially accomplished by transferring a fixed charge of electricity into a large capacitor from a small capacitor which has previously received a unit charge. In order that the system may follow a linear function over a wide range, it is necessary that the unit charge transfer from the smaller capacitor to the larger capacitor shall be accomplished by a complete transfer of the charge at each increment. Moreover, the unit charges placed into the smaller capacitor must be maintained constant for each increment over the entire range.

Figure 2:
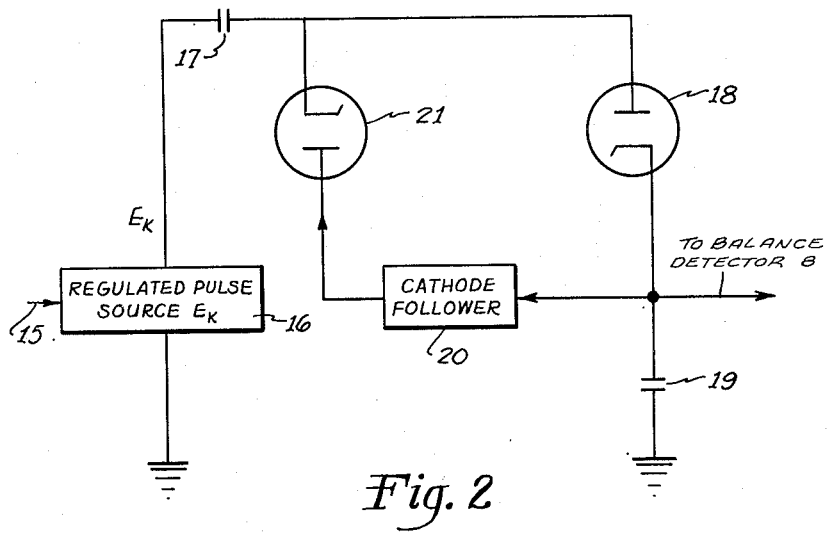
Figure 2 is a simplified circuit diagram of the integrator showing the first feedback path.

These results are obtained in general by the simplified circuit of the integrator shown in Figure 2. In this figure a regulated pulse source 16 puts out a precisely determined pulse amplitude each time it receives an output from the master oscillator 5 over the wire 15. The pulse is fed to a series circuit consisting of the small capacitor 17, diode 18, and a large capacitor 19. Although the amplitude of the pulses must be precisely determined, the pulse width need not be because the values of capacitors 17 and 19 are chosen so as to present a low impedance circuit to the output and therefore the capacitors become almost completely charged long before the pulse is completed. The input to a cathode follower circuit is connected between the diode 18 and capacitor 19, and the output of the cathode follower is fed back to the junction of capacitor 17 and diode 18 through the diode 21. The output is taken between the diode 18 and capacitor 19. Each voltage pulse put out by the regulated source 16 is divided between capacitors 17 and 19 according to the formula $$\frac{C_{17}}{C_{17}+C_{19}} \times E_k$$

where $E_k$ is the amplitude of the pulse put out by the source 16. It will be apparent that capacitor 17 is repetitively charged and discharged by the regulated pulse source 16 in a manner such that the unit charge in 17 is transferred into the larger capacitor C-7 through transfer diode 18. During each negative transition of the regulated pulse source the potential across the capacitor 17 is restored by the feedback cathode follower and the diode 21 to the potential which has just previously been accrued on the capacitor 19. This feedback results in the capacitor 17 passing through the same change of charge for each pulse from the regulated pulse source. If the capacitor 17 passes through the same change of charge on each positive transition from the pulse source, then the same number of coulombs will be transferred into capacitor 19 upon each pulse or increment. This results in a linear summation of the constant voltage $E_k$.

The manner in which this constant coulomb charge on the capacitor 17 is obtained can be demonstrated by an analysis of the operation of the system. The diode 18 is inserted in series with the capacitors 17 and 19 so as to break this path during the negative transition of the pulse source and thereby prevents discharge of the capacitor 19 during this period. When a positive pulse is applied to the input of this circuit the plate of the diode 18 is driven positive with respect to the cathode and the charge supplied by the pulse source divides between the capacitors 17 and 19. Assuming that a 100-volt pulse is applied and that the capacitor 19 is 99 times larger than capacitor 17, then one volt will appear across the capacitor 19. The right hand plate of capacitor 17 will be at a one volt level owing to the accrued potential across the capacitor 19. If no feedback were provided, during the negative excursion of the pulse from the source 16, the capacitor 17 would stay fully charged, and the right-hand plate of the capacitor would be at −99 volts when the left-hand plate was returned to zero volts. As a result no current would be passed by this circuit during the next pulse, since there would be a back voltage of 100 volts across the diode 18. In order to eliminate this effect the right-hand plate of the capacitor 17 is restored during each negative excursion of pulse 16 to the same potential as the upper plate of the capacitor 19 by means of the feedback path consisting of the cathode follower 20 and diode 21. During the negative transition of the pulse, the cathode of diode 21 becomes slightly negative with respect to its plate and allows conduction through this feedback path. As a result the cathode and plate of the diode 18 will be at the same potential after this restoration and there will be no back voltage across the diode 18 prior to the application of the next positive pulse. This arrangement causes the 100-volt pulse source always to drive the capacitor 17 through the same change of charge, and since the value of the capacitor 17 remains constant, it will always accrue the same coulomb charge. Therefore the feedback path allows this system to operate on a constant-coulomb-capacitor counter basis.

Figure 3:
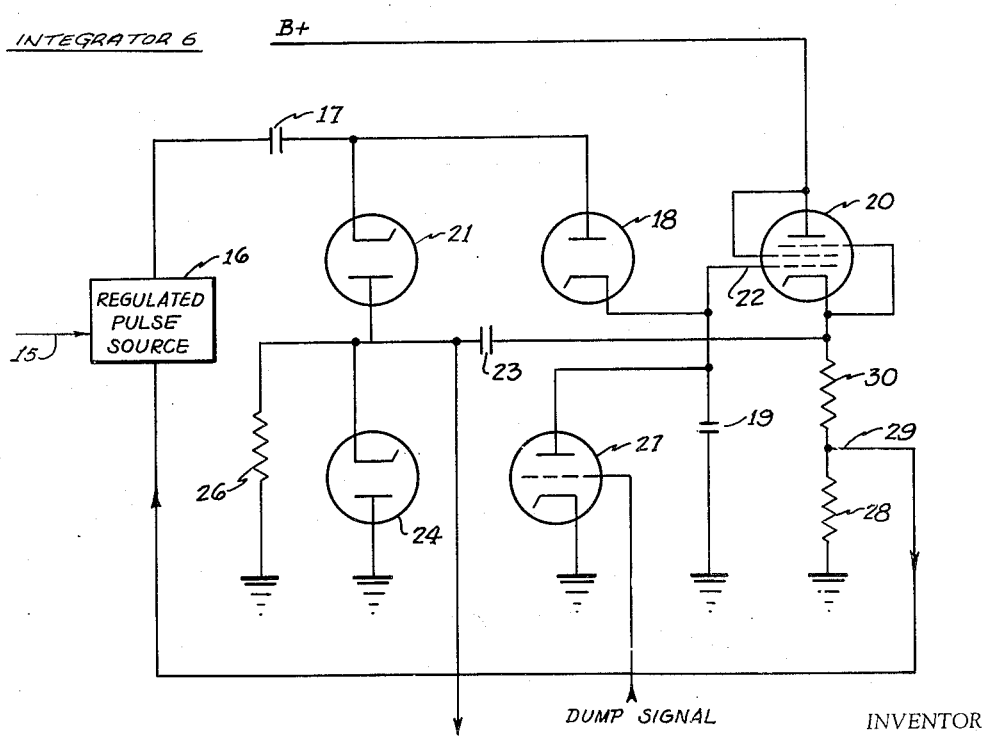
Figure 3 is a complete circuit diagram of the integrator showing the first and second feedback paths.

Since the cathode follower 20, shown in Figure 2, does not provide unity gain, it follows that the plate and cathode of the diode 18 would not be restored to exactly the same potential. This difficulty is taken care of by a second feedback path as shown in the circuit of Figure 3. In this circuit the components which correspond to the components in Figure 2 carry the same reference numerals. The junction of the diode 18 and capacitor 19 is connected to the grid 22 of the cathode follower 20. The output of the cathode follower is connected through capacitor 23 to the plate of the diode 21 to establish the first feedback path identified in connection with Fig. 2.

In order to restore repetitively the initial charge on the capacitor 23 between each complete cycle of pulse integration, another diode 24 is connected from the junction of capacitor 23 and diode 21 to ground, the plate being grounded. This diode is shunted by resistor 26. The diode 24 restores the potential on the output end of capacitor 23 to zero voltage at the completion of each cycle of integration. The capacitor 19 is shunted by the triode 27 which receives the dump signal to discharge the capacitor 19 after a count has been completed. A portion of the cathode follower output which is determined by the relative values of resistors 28 and 30 is fed back to the pulse source 16 over the lead 29 which defines a second feedback path. The output of the system is taken between diodes 21 and 24. It was found necessary to insert the capacitor 23 in the first feedback path to compensate for the difference of potential between the grid and cathode of the cathode follower. That is, since all cathode followers have some stagger in the voltage between the grid control and cathode output it is necessary to subtract such difference by A. C. coupling through the capacitor 23. The introduction of capacitor 23 also causes some degeneration in the system, since on the negative transition of the pulse source 16, the capacitors 23 and 17 and diode 21 constitute the same type of circuit as capacitors 17 and 19 and diode 18. By properly choosing the values of the capacitors 17, 19, and 23, this effect can be maintained at a very low value. That is, if the capacitor 23, is, for instance, 99 times larger than capacitor 19, then for each one volt positive accrual on capacitor 19, there will be a 0.01 volt negative accrual in capacitor 23. This degeneration would introduce a nonlinearity of only one percent. However, this nonlinearity and the nonlinearity introduced by the fact that the cathode follower falls a little short of providing an ideal unity gain can be corrected by the use of the second feedback path. If the degenerative signal voltage which accrues in the capacitor 23 is equal to one percent of the output voltage and the degenerative gain characteristics of the cathode follower introduce another two percent error in the system, values of resistors 28 and 30 are so chosen that a voltage equal to 3 percent of the voltage output is fed back to and in series with the prime voltage reference source. This feedback voltage increases the output of the source by the total degenerative percentage.

In other words, assuming an initial voltage pulse output of 100 volts, and therefore a one volt accrual across the capacitor 19, approximately 0.03 volt will be fed back to the regulated source and the next pulse from that source will be equal to 100.03 volts rather than 100 volts. Therefore, the degenerative errors will be corrected during the next and succeeding pulses.

At the end of a count a dump signal is sent to the triode 27 from the electronic switch and the capacitor 19 is discharged through the triode. This returns the cathode of the cathode follower to its initial minimum potential, and the capacitor 23 is returned to its initial charge by discharging the small negative voltage accumulated on its left plate through the diode 24 to ground. At the same time the capacitor 17 is discharged through the diode 18 and triode 27, thereby restoring the system to its starting condition. The resistor 26 stops drift during static times; that is, this resistor in conjunction with diode 24 prevents the capacitor 23 from accruing a charge during static periods.

Figure 4:
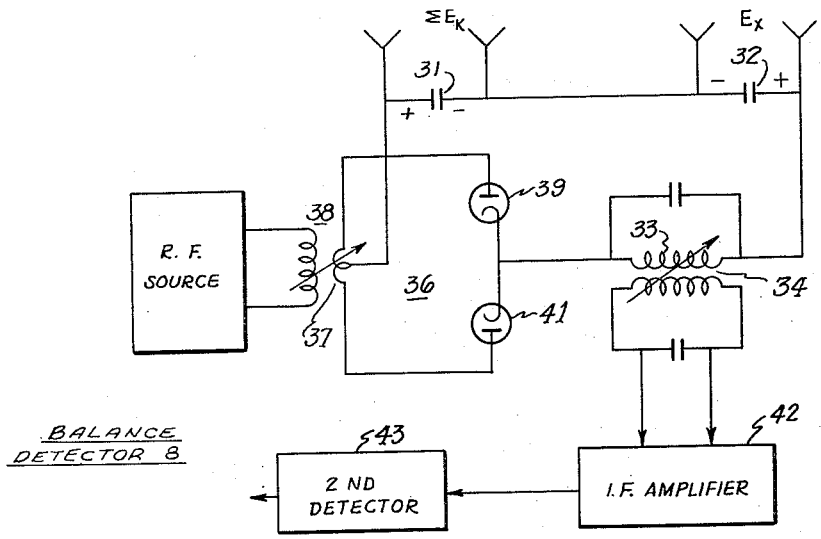
Figure 4 is a circuit diagram of the balance detector.

The output of the integrator 6 (Fig. 1) is fed to the balance detector 8 where the integrated voltage $\Sigma E_k$ from the integrator is compared with the analogue voltage $E_x$. Referring to Figure 4, the voltage $\Sigma E_k$ is applied across capacitor 31 in series with the capacitor 32 across which is applied an analogue voltage $E_x$. These capacitors are connected in series with the primary 33 of the transformer 34, which is shunted by capacitor 35, and with the full-wave rectifier 36. The primary 33 and capacitor 35 and secondary 37 and capacitor 45 are tuned to the second harmonic of the frequency of the voltage from the source 40. The rectifier circuit 36 consists of the secondary 37 of transformer 38 in series with the diodes 39 and 41, which have their cathodes connected together. The junction of these two cathodes is connected to the primary 33 of transformer 34. The R.-F. source 40 is coupled into the circuit through the transformer 38. The voltage $E_x$ is applied to the circuit so that a positive voltage appears at the right side of the capacitor 32. The voltage $\Sigma E_k$ is applied so as to buck this voltage; that is, the positive side of the capacitor 31 is on the left side. Initially the voltage $E_x$ is larger than $\Sigma E_k$ and therefore the voltage appearing at the cathodes of the diodes 39 and 41 is positive with respect to the voltage appearing at the plates of these diodes. As a result there can be no conduction through the diodes and the R.-F. voltage coupled in the rectifier circuit is blocked. However, when the voltages $\Sigma E_k$ and $E_x$ are of equal value, the diodes 39 and 41 can conduct and therefore current can flow through the series circuit consisting of the capacitors 31 and 32, transformer primary 33 and the full-wave rectifier 36. Owing to the action of the full-wave rectifier, this signal has a frequency which is equal to twice the frequency of the voltage supplied by the source 40. As already pointed out, the primary and secondary of transformer 34 are tuned to this second harmonic and therefore this signal will be passed by the transformer and coupled into the I.-F. amplifier. After amplification the signal is fed to the second detector 43 where it is converted to a D. C. voltage and differentiated so as to produce a stop pulse signal which is sent to the electronic switch 2.

It is apparent that the only time current can flow from the source of unknown voltage $E_x$ is at the one instant before shutoff when the voltages $\Sigma E_k$ and $E_x$ are equal, for immediately subsequent to the action of the stop pulse produced by the second detector, $\Sigma E_k$ is returned to zero by the dump signal. Therefore the effective impedance of this circuit to $E_x$ is very high and presents a negligible drain upon this source. Another important advantage of this system stems from the use of the two diodes to chop the difference of $\Sigma E_k$ and $E_x$ at a frequency that is the second harmonic of the oscillator frequency. If the two diodes do not have matched capacitances, which is usually the case, a voltage, which is in no way related to the relative values of $\Sigma E_k$ and $E_x$, appears across the winding 33. However, since this circuit is tuned to the second harmonic of the frequency of source 40 this fundamental voltage has no effect. Also it will be seen that the input signals may be chopped at any frequency desired merely by changing the oscillator frequency and the resonant frequency of the tuned circuits.

It will be apparent that the embodiments shown are only exemplary and that various modifications can be made in construction and arrangement within the scope of my invention as defined in the appended claims.

I claim:

1. In a step-charger integrator having a regulated source of discrete pulses and a charge-accumulating condenser, means to transfer pulses from said source in equal incremental charges to said accumulator comprising, a coupling capacitor connected to said pulse source, a first charge transferring unilateral conducting device defining a circuit path between said coupling capacitor and said accumulator, a second feedback unilateral conducting device defining a feedback circuit path including a cathode follower and capacitor connected in series between said coupling capacitor and said accumulator, said charge transferring unilateral conducting device being poled to conduction and said feedback unilateral conducting device being poled to cutoff upon application of a positive pulse to said coupling capacitor, and a second feedback circuit connecting said cathode follower to said pulse source for adding a predetermined percentage of the voltage stored in the accumulator in series with said voltage pulses.

2. The invention of claim 1 in which, each of said unilateral conducting devices comprises a diode the anode of said transfer diode and the cathode of said feedback diode being connected to said coupling capacitor and means for restoring the initial charge on said series-connected capacitor comprising a third device the cathode of which is connected to the common junction between said feedback diode and said series-connected capacitor, the anode of said third diode being connected to ground.

3. The invention of claim 2 in which the cathode of said charge-transferring diode is connected to the input of said cathode follower and including an amplifier having an output connected to the input of said cathode follower, the input of said amplifier being connected to receive a control pulse for clearing said accumulator upon completion of a cycle of integration.

References Cited in the file of this patent

UNITED STATES PATENTS

| | | |
|---|---|---|
| 2,473,457 | Tyson | June 14, 1949 |
| 2,487,191 | Smith | Nov. 8, 1949 |
| 2,529,547 | Fisher | Nov. 14, 1950 |
| 2,573,150 | Lacy | Oct. 30, 1951 |
| 2,582,490 | Land | Jan. 15, 1952 |
| 2,611,861 | Heath | Sept. 23, 1952 |
| 2,621,292 | White | Dec. 9, 1952 |
| 2,625,600 | Benaglio | Jan. 13, 1953 |
| 2,630,562 | Johnson | Mar. 3, 1953 |